(12) United States Patent
Ishino et al.

(10) Patent No.: US 8,133,517 B2
(45) Date of Patent: *Mar. 13, 2012

(54) DEAERATED PACKAGED FROZEN SUSHI, PROCESS FOR PRODUCING THE SAME AND METHOD OF COOKING

(75) Inventors: Yuji Ishino, Ishikawa (JP); Hironobu Kadoya, Ishikawa (JP)

(73) Assignee: Polar Star Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/817,281

(22) PCT Filed: Mar. 1, 2006

(86) PCT No.: PCT/JP2006/304414
§ 371 (c)(1),
(2), (4) Date: Aug. 28, 2007

(87) PCT Pub. No.: WO2006/093316
PCT Pub. Date: Sep. 8, 2006

(65) Prior Publication Data
US 2009/0022857 A1    Jan. 22, 2009

(30) Foreign Application Priority Data
Mar. 1, 2005 (JP) ................... 2005-056727

(51) Int. Cl.
*A21D 10/02* (2006.01)
(52) U.S. Cl. ........ 426/107; 426/396; 426/129; 426/234; 426/426; 426/393; 426/412; 426/394; 426/126; 426/404; 426/113
(58) Field of Classification Search .................. 426/107, 426/126, 234, 412, 524, 643
See application file for complete search history.

(56) References Cited

U.S. PATENT DOCUMENTS
5,230,914 A * 7/1993 Akervik ................... 426/107
(Continued)

FOREIGN PATENT DOCUMENTS
JP          57-063082        4/1982
(Continued)

OTHER PUBLICATIONS
JP07000096abstractnpl.*
(Continued)

*Primary Examiner* — Drew Becker
*Assistant Examiner* — Preston Smith
(74) *Attorney, Agent, or Firm* — Ostrolenk Faber LLP

(57) ABSTRACT

A microwavable vacuum-packed frozen sushi product comprising: a flexible microwave-safe plastic packing bag which is vacuumed to a pressure of 50 to 600 mmHg and, in the pressure-reduced state, hermetically sealed; an open-topped plastic box placed in said packing bag; and a sushi product placed in said box; said vacuum-packed frozen sushi product being such that a space is formed in said packing bag in the pressure-reduced state around said sushi product and the space has, in total, a volume 0.1 to 0.7 times that of said sushi product; an inner surface of said packing bag is in contact with an upper surface of said sushi product; and said packing bag, said box and said sushi product are frozen together in a unified form. Water vapor generated during thawing is allowed to flow through a space formed between the sushi material and the box and the packing bag to heat a rice section and a material or materials, thereby providing the sushi product with diminished unevenness in temperature distribution.

9 Claims, 4 Drawing Sheets

U.S. PATENT DOCUMENTS

| | | | | |
|---|---|---|---|---|
| 5,370,895 A | * | 12/1994 | Doerter | 426/573 |
| 5,861,184 A | * | 1/1999 | Ishino et al. | 426/107 |
| 5,863,578 A | * | 1/1999 | Guarino | 426/113 |
| 5,945,152 A | * | 8/1999 | Purser | 426/646 |

FOREIGN PATENT DOCUMENTS

| | | | |
|---|---|---|---|
| JP | 361257147 | * | 11/1986 |
| JP | 07000096 | * | 1/1995 |
| JP | 8-214805 | | 8/1996 |
| JP | 8-317764 | | 12/1996 |
| JP | 9-47242 | | 2/1997 |
| JP | 2001-275591 | | 10/2001 |

OTHER PUBLICATIONS

JP361257147abstractnpl.*
polypropylenevsnylon, 1996.*

* cited by examiner

DEAERATED PACKAGED FROZEN SUSHI, PROCESS FOR PRODUCING THE SAME AND METHOD OF COOKING

CROSS REFERENCE TO RELATED APPLICATION

The present application is a 35 U.S.C. §§371 national phase conversion of PCT/JP2006/304414, filed Mar. 1, 2006, which claims priority of Japanese Patent Application No. 2005-056727, filed Mar. 1, 2005, the disclosure of which has been incorporated herein by reference. The PCT International Application was published in the Japanese language.

TECHNICAL FIELD

The present invention relates to a packed frozen sushi product suitable for thawing, and a method for preparing the same, and a method for cooking the same. More particularly, it relates to a microwavable packed frozen sushi product suitable for thawing by means of a microwave oven, and methods for preparing and for cooking the same. Further, the present invention relates to a vacuum-packed frozen sushi product suitable for thawing in a microwave oven, which comprises a sushi product being contained in a plastic container and being put with the plastic container in a packing container made of a plastic film, and being vacuum-packed and hermetically sealed in the packing container made of a plastic film with the sushi product and the containers in tight contact with each other and being frozen in a unified form, and methods for preparing and for cooking the same.

BACKGROUND ART

In the case of, for example, a rod-shaped sushi (bou-zushi), vinegared rice is shaped, and the shaped rice section is topped with a sushi material or materials such as boned and prepared sea bream, sockeye salmon or mackerel together with a thin slice of kombu kelp (shiroita kombu) cooked in a broth seasoned with vinegar, sugar and salt, and resultant is shaped into any of various shapes such as the rod-shape. The shaped sushi product is wrapped with a bamboo sheath and placed in a packing bag made of a plastic film and vacuum-packed, the vacuum-packed sushi product is frozen with a brine such as ethanol, or the shaped sushi product is frozen, and the frozen shaped sushi product is placed in a packing bag made of a plastic film and vacuum-packed, to thereby prepare a vacuum-packed frozen sushi product.

Such a packed frozen sushi product by means of brine freezing is prepared by placing a sushi product in a plastic packing bag, vacuum-packing the sushi product, and brine freezing the vacuum-packed sushi product. Accordingly, no attachment of bacteria to the sushi product or no absorption of odor from the coolant gas in the sushi product in a freezing room is caused, and therefore, the packed frozen sushi product is hygienically superior to, for example, a packed frozen sushi product prepared by vacuum-packing a sushi product posterior to freezing of the sushi product by slow freezing such as air-blast freezing, nitrogen or carbon dioxide freezing. In particular, such a packed frozen sushi product frozen by brine freezing can be stored stably, for example, over a period as long as 3 months or longer when stored at a storage temperature of −18° C., or can be stored for 6 months or longer when stored at a storage temperature of −50° C.

However, a vacuum-packed frozen sushi product which has been stored in such a manner is thawed and then served. Methods for thawing a packed frozen sushi product include natural thawing, running water thawing, steam thawing, hot water thawing and microwave thawing. In these methods, microwave thawing is suitable for thawing of a frozen sushi product or the like because of its extremely short thawing time and high thawing yield. For example, in the case of a rod-shaped sushi product as described above, the thawing thereof at room temperature requires five hours, whereas microwave thawing can thaw the rod-shaped sushi product in 2 to 5 minutes. Accordingly, microwave thawing can immediately meet the demands and thus is convenient as compared with thawing at room temperature (see Japanese Unexamined Patent Publication No. Hei 8 (1996)-214805, Japanese Unexamined Patent Publication No. Hei 8 (1996)-317764, Japanese Unexamined Patent Publication No. Hei 9 (1997)-47242, Japanese Unexamined Patent Publication No. 2001-275591 and the specification of U.S. Pat. No. 5,861,184).

However, in the case of microwave thawing, heat values generated by microwave absorption are different between the frozen sushi material section and the frozen rice section, and these are also different in quantity. Further, because a surface portion of sushi product is intensively heated as compared with a central portion of sushi product, a portion of the sushi material or materials is heated to an undesirably high temperature as compared with the rice section. The sushi material or materials are thereby brought into the so-called cooked condition, and the tastes thereof are impaired. Therefore, microwave thawing has not been practically used. In the case of, for example, a box-shaped sushi product or a rod-shaped sushi product, in general, a rice section has preferably body temperature, for example, the rice section preferably has temperatures of 15 to 25° C., more preferably 15 to 20° C. although this is dependent upon the type of the sushi product, whereas a sushi material or materials, for example, conger eel or eel is preferred to have roughly the same temperatures as the rice section, for example, temperatures of 10 to 25° C., more preferably 10 to 20° C. although this is dependent upon the type of the sushi material or materials. However, when a packed frozen sushi product is thawed by means of a microwave oven, a sushi material or materials are heated to relatively high temperatures to impair the taste of the sushi product. Accordingly, it is difficult to effect desired thawing by means of a microwave oven. Under such circumstances, with a view to solving the problem that in thawing a vacuum-packed frozen sushi product by means of microwave heating by a microwave oven or the like, a sushi material or materials of the sushi product are liable to be heated to relatively high temperatures to thereby impair taste of the sushi product, the present inventors made a proposal to prepare a so-called vacuum-packed frozen sushi product suitable for frozen storage by wrapping a sushi product topped with a sushi material or materials with a plastic wrapping film, placing the wrapped sushi product in a plastic film packing bag for frozen foods, vacuuming and hermetically seal the packing bag to vacuum-pack the sushi product, and freezing the sushi product in the hermetically packed state in whole by brine-freezing in a unified form, and in thawing the thus prepared packed frozen sushi product by means of a microwave oven, to effect thawing by heating the sushi product by a microwave oven in a relatively short time, and terminating the heating by the microwave oven so as not to raise temperatures of the sushi product under the thawing to high temperatures, and heating the sushi product with water vapor emanating from a heated rice section and prevailing in the plastic wrapping film package and the heat of the rice section while steaming, during the microwave heating and even after removal of the sushi product from the microwave oven, so as to bring a temperature of a portion where the sushi material or materials and the rice section are in contact with each other to 15° C. or higher.

For preparing such a vacuum-packed frozen sushi product, however, it is necessary to place a sushi product on a plastic wrapping film, tightly wrap the sushi product with the plastic wrapping film, place the wrapped sushi product in a plastic film packing bag for frozen foods, and vacuum and hermetically seal the packing bag. This procedure should be performed carefully, and such a packed frozen sushi product is difficult to prepare on a large scale. Accordingly, there is a problem that production of such a packed frozen sushi product to meet customers' demands involves many manual labors and much time.

It is an object of the present invention to provide a vacuum-packed sushi product which is capable of solving the problems inherent in a conventional vacuum-packed frozen sushi product wrapped with a plastic film and which is suitable for thawing by means of a microwave oven.

DISCLOSURE OF INVENTION

The present inventors have found that by placing a sushi product such as a rod-shaped sushi product in a box, placing the sushi product in a flexible packing bag together with the box containing the same, vacuuming the packing bag to a pressure of 50 to 600 mmHg to thereby bring the inside of the packing bag to a pressure-reduced state, allowing the flexible packing bag in the pressure-reduced state to deflate under atmospheric pressure, and hermetically sealing the packing bag in the deflated state with its mouth hermetically closed, a space having a volume 0.1 to 0.7 times that of the sushi product is formed around the sushi product because the sushi product is placed in the box, and by virtue of the formation of the space in the pressure-reduced state around the sushi product, it is possible to heat a rice section to a temperature of 50° C. or higher by means of a microwave oven without breaking the packing bag. The present inventors have also found that when the vacuum-packed frozen sushi product is heated by means of a microwave oven, the rice section and a sushi material or materials of the sushi product are steamed by water vapor emanating in the packing bag to thereby effect thawing of the vacuum-packed frozen sushi product in a relatively short time. The present inventors have further found that when the vacuum-packed frozen sushi product is heated by means of a microwave oven, water vapor prevails in the packing bag to efficiently heat the sushi material or materials by steaming, enabling temperature differences in the thawed sushi product to be diminished.

The present invention has been made based on these findings. It is, therefore, an object of the present invention to provide a packed frozen sushi product which can be produced on a large scale and which is suitable for microwave thawing, and a method for preparing the same, and a method cooking the same.

In other words, the present invention resides in a microwavable vacuum-packed frozen sushi product comprising: a flexible microwave-safe plastic packing bag which is vacuumed to a pressure of 50 to 600 mmHg and, in the pressure-reduced state, hermetically sealed; an open-topped plastic box placed in said packing bag; and a sushi product placed in said box; said vacuum-packed frozen sushi product being such that a space is formed in said packing bag in the pressure-reduced state around said sushi product and the space has, in total, a volume 0.1 to 0.7 times that of said sushi product; an inner surface of said packing bag is in contact with an upper surface of said sushi product; and said packing bag, said box and said sushi product are frozen together in a unified form. In the vacuum-packed frozen sushi product of the present invention, the pressure in packing bag may be 140 to 350 mmHg, and the box may be a box-, cylinder-, tray- or dish-like container having a square shape, a round shape or an ellipse shape when viewed in a plan, and the microwave-safe plastic packing bag may be made of a laminated film composed of a nylon film and a polypropylene film having a thickness larger than that of the nylon film. The present invention also resides in a method for preparing a microwavable vacuum-packed frozen sushi product, said method comprising: disposing a sushi material or materials on a top of a shaped rice section or in the shaped rice section to prepare a sushi product; placing the prepared sushi product in a plastic box; placing said plastic box containing the sushi product in a flexible microwave-safe plastic packing bag; vacuuming said packing bag to a pressure of 50 to 600 mmHg and hermetically sealing said packing bag to prepare a vacuum-packed sushi product with a space formed in the vacuum-packed sushi product around the sushi product in a volume 0.1 to 0.7 times that of the sushi product exclusive of that of said box; and cooling said vacuum-packed sushi product with a refrigerant cooled to a freezing temperature to freeze said packing bag, said box and the sushi product of said vacuum-packed sushi product together in a unified form. The present invention further resides in a method for cooking the microwavable vacuum-packed frozen sushi product by means of a microwave oven, said method comprising: applying heat by microwave heating to a microwavable vacuum-packed frozen sushi product comprising: a flexible microwave-safe plastic packing bag which is vacuumed to a pressure of 50 to 600 mmHg and, in the pressure-reduced state, hermetically sealed; an open-topped plastic box placed in said packing bag; and a sushi product placed in said box; said vacuum-packed frozen sushi product being such that a space is formed in said packing bag in the pressure-reduced state around said sushi product and the space has, in total, a volume 0.1 to 0.7 times that of said sushi product; an inner surface of said packing bag is in contact with an upper surface of said sushi product; and said packing bag, said box and said sushi product are frozen together in a unified form, to thereby bring a temperature of at least a part of exposed longitudinal ends of the shaped rice section to 50° C. or higher, followed by termination of the microwave heating; and allowing the resulting vacuum-packed sushi product to stand in a room or water or to stand in a room and then in water within a period of 30 minutes or shorter without unpacking, thereby steaming the shaped rice section and the sushi material or materials by water vapor emanating in the packing bag to bring temperatures of the sushi material or materials and the rice section to 10° C. or higher.

In the vacuum-packed frozen sushi product of the present invention which is suitable for a cooking method by means of a microwave oven, the inside of the packing bag is brought to a pressure of 600 mmHg or lower, preferably 400 mmHg or lower, more preferably 350 mmHg by the vacuuming at the time of the packing. Further, in the present invention, the box is an open-topped box and may be a box-, cylinder-, tray- or dish-like container having a square shape, a round shape or an ellipse shape when viewed in a plan.

The vacuum-packed frozen sushi product of the present invention comprises a vacuumed and frozen packing bag made of a plastic film, an open-topped plastic box placed in the packing bag, and a frozen sushi product having a shaped rice section and a sushi material or materials disposed thereon, and these are frozen together in a unified form. In the present invention, a space is formed around the sushi product which space has a volume 0.1 to 0.7 times that of the sushi product. By forming the space as described above, when thawing is effected using a microwave oven, flow of generated water vapor is promoted through the space, and the thawed sushi product is steamed to thereby enable the entire sushi product to have a roughly uniform temperature in a relatively short time. Accordingly, in the present invention, the packed frozen sushi product can be thawed and steamed with the water vapor generated in the thawing to enable the thawed sushi product to have intended approximated temperatures, and thus the resulting sushi product can be eaten delectably. As described above, the vacuum-packed frozen sushi product of the present invention can be cooked simply and easily, and thus non-uniformity of temperatures inherent in thawing is solved. Accordingly, by freezing and storing boxed sushi products using a seasonal sushi material or materials, it is possible to provide vacuum-packed frozen sushi products using a seasonal sushi material or materials which can delectably be eaten irrespective of season.

BEST MODE FOR CARRYING OUT THE INVENTION

Figure 1:
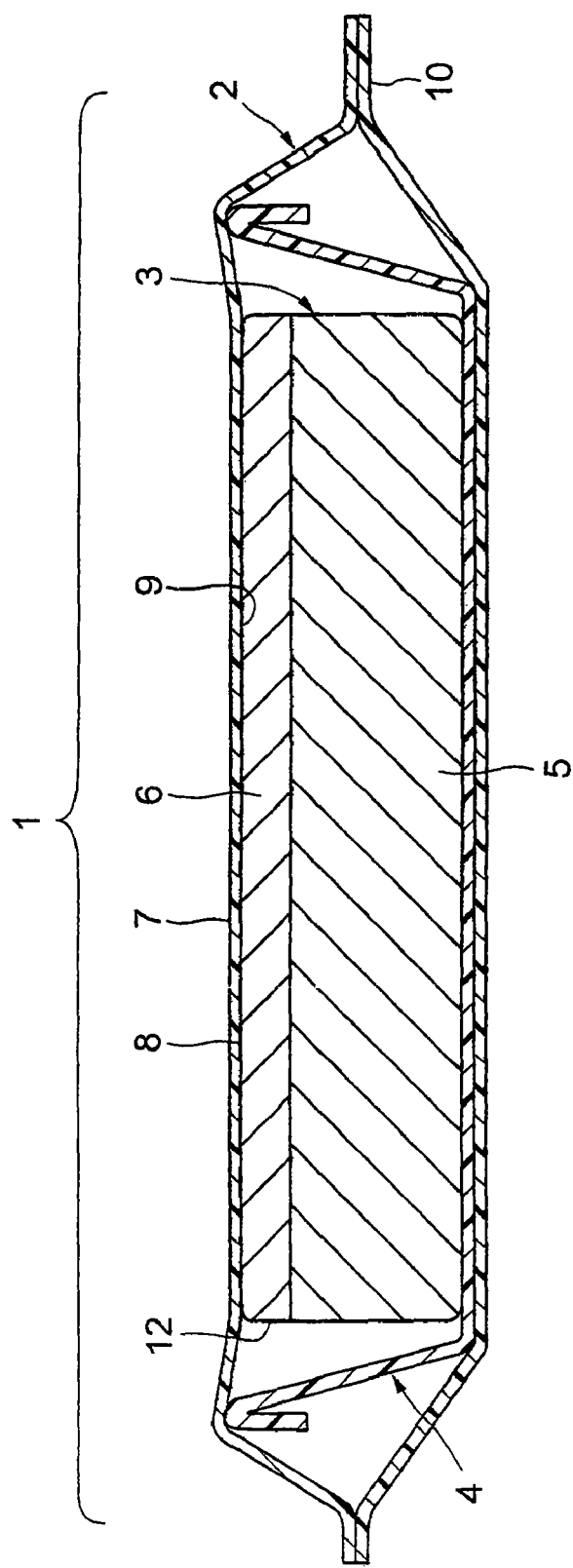
FIG. 1 is a schematic sectional side view schematically illustrating one Embodiment of the present invention.

In the present invention, a sushi product means a rod-shaped sushi product (bou-zushi), a pressed sushi product (oshi-zushi), or a sushi product pressed in a box, i.e., a boxed sushi product (hako-zushi). In the present invention, freezing of a sushi product is performed with the sushi product placed in a box. In this procedure, the sushi product may be placed in the box with its sushi material or materials (gu or neta) up and with its shaped rice section down, or the sushi product may be placed in the box with its shaped rice section up and with its sushi material or materials down. In the present invention, the sushi product may be one having a sushi material or materials as its core such as a rolled sushi product (maki-zushi) or one having a sushi material or materials between shaped rice sections. In the present invention, the sushi product may be placed in an appropriate microwave-transparent rigid or non-rigid plastic box. Preferably, the box is a microwave-transparent plastic box.

In the present invention, the box containing the sushi product is placed in a flexible plastic packing bag. In this connection, in order to facilitate vacuuming and cooling of the inside of the box, the box containing the sushi product is placed, with no covering thereon, in the flexible plastic packing bag. The box containing the sushi product is placed in the flexible plastic packing bag, and the packing bag is vacuumed and hermetically sealed, and the vacuumed and hermetically sealed packing bag is frozen by brine freezing, air-blast freezing, nitrogen or carbon dioxide freezing or the like. In the present invention, the packed frozen sushi product is such that the plastic box and the sushi product in the packing bag are frozen together in a unified form. In the present invention, the packed frozen sushi product is preferably prepared by cooling the flexible plastic packing bag which contains the box containing the sushi product and which has been vacuumed and hermetically sealed to freeze the contents of the packing bag because a refrigerant does not directly contact the sushi product and because cooling efficiency is improved. Further, in the present invention, the sushi product processed into the packed frozen sushi product includes sushi products of a type comprising a shaped rice section topped with a sushi material or materials, for example, a sushi product pressed in a box, i.e., a boxed sushi product, a rod-shaped sushi product, a pressed sushi product and the like, and one sushi product may be placed in a box and placed in a packing bag together with the box and packed and frozen or a plurality of sushi products may be placed together in a box and placed in a packing bag together with the box and packed and frozen. When a plurality of sushi products are placed in a box, it is preferred that each of the sushi products be so wrapped with a microwave-transparent plastic film as to permit generated water vapor to flow out, or microwave-transparent plastic partition pieces be interposed between the sushi products to partition them, thereby preventing adjacent sushi products from adhering to each other after thawing.

In the vacuum-packed frozen sushi product of the present invention, the box and the packing bag are made of a microwave-transparent material, for example, a plastic box and a plastic packing bag or the like are used. In the present invention, the plastic box for containing the sushi product may have such a shape as in a generally used box, and its bottom has such a size that the sushi product form fittingly rests thereon when the sushi product is contained in the box, and its plan-, side- and cross-sectional-shapes are so designed as to substantially conform to the shape of the sushi product. With a view to rendering it easy to put in and to take out the sushi product, however, it is preferred that the plastic box for containing the sushi product be so formed as to have its top opening having a width and a length which are larger than those of its bottom, i.e., the top opening be so formed as to be broader than the bottom. If the top opening of the box is so formed as to be broader than the bottom as described above, it is rendered easy to put in and to take out the sushi product, and yet a space is advantageously formed around the sushi product.

In the present invention, the reduced pressure in the flexible packing bag which is made of a plastic film and microwave-safe, i.e., the flexible microwavable packing bag made of a plastic film may be 50 to 600 mmHg. However, the reduced pressure is preferably 140 to 400 mmHg, more preferably 140 to 350 mmHg. In such a pressure-reduced state, the space formed around the sushi product advantageously provides interspaces between the sushi product and the box and between the box and the packing bag during thawing because volumetric change is slight due to the reduced pressure in the packing bag. In the present invention, in the vacuumed flexible microwave-safe packing bag made of a plastic film, the interspaces between the box and the sushi product and between the box and the packing bag, i.e., the space formed around the sushi product permits water vapor emanating at least from the shaped rice section by heating in thawing to flow through the space. The space has a volume which enables steaming of the sushi product after the thawing. If the space has a large volume, the resulting product is bulky as a whole. In addition, a larger space formed around the sushi product in the packing bag undesirably results in a smaller steaming effect. On the other hand, a smaller space formed around the sushi product in the packing bag undesirably takes a longer time to effect approximately uniform steaming over the sushi product. In the present invention, a size of the space formed around the sushi product is 0.1 to 0.7, preferably 0.2 to 0.5, when the volume of the sushi product is supposed to be 1. The ratio of the volume of the space formed around the sushi product to the volume, which is supposed to be 1, of the sushi product is larger when the pressure resulting from the vacuuming is lower.

In the present invention, the volume of the space formed around the sushi product in the vacuumed flexible microwave-safe packing bag made of a plastic film is that derived from subtracting the volume of the box and the volume of the sushi product from the volume of the interior of the vacuumed flexible microwave-safe packing bag made of a plastic film. In the present invention, since the shaped rice section and the sushi material or materials of the sushi product are placed in the bag made of a plastic film and hermetically vacuum-packed, when the shaped rice section and the sushi material or materials are once packed, these are optimally protected from entry of ambient air, moisture or bacteria.

In the present invention, thawing of the packed frozen sushi product is performed, for example, by microwave-heating by means of a microwave oven or the like. In this case, thawing of the shaped rice section of the sushi product is effected with heat generated by absorption of microwaves with which the shaped rice section is irradiated in the microwave oven. The thawing of the packed frozen sushi product may be effected with the opening of the box up or with the box upside down. In a case where the sushi material or materials may be heated, when the thawing is performed with the sushi material or materials up, the sushi material or materials and the shaped rice section can be heated together to bring temperatures of the sushi material or materials and the shaped rice section which have been thawed by the microwave oven to substantially the same levels. In a case where the sushi material or materials are desired not to be heated, when the thawing is performed with the sushi material or materials located under the shaped rice section, almost all microwaves in the microwave oven are applied to the shaped rice section to enable the sushi material or materials of the sushi product which has been thawed by the microwave oven to have temperatures lower than those of the shaped rice section. In the present invention, when the sushi material or materials are surrounded with a rice section having a thickness of 1 cm or more, preferably 2 cm or more, temperatures of the rice section and those of the sushi material or materials can be brought, respectively, to lukewarmths and to 10° C. to 25° C., preferably 15° C. to 20° C. According to purpose of the thawing of the packed frozen sushi product, the packed frozen sushi product may be thawed with the opening of the box up or with the box upside down.

In the present invention, if the sushi material or materials are desired not to be heated, the thawing of the sushi material or materials by means of a microwave oven is effected only with heat and water vapor which are emanating from the shaped rice section of the sushi product. In this case, although the thawing of the packed frozen sushi product is dependent upon a weight and a storage temperature of the packed frozen sushi product, the thawing may be performed, for example, in such a manner that the frozen packed sushi product is heated by microwave-heating in a microwave oven for 3 minutes to 5 minutes to effect mainly heating of the frozen shaped rice section, and then, without opening the packing bag, the resultant is allowed to stand, for example in a room, for a period of 15 minutes to 45 minutes, preferably 15 to 30 minutes to steam the sushi material or materials with the water vapor emanating from the shaped rice section and to apply the heat of the shaped rice section to the sushi material or materials, whereby the thawing of the sushi material or materials is effected. In the present invention, thawing may be effected by heating the vacuum-packed frozen sushi product by means of a microwave oven to raise the temperature of the rice section to 50° C. at the lowest, and without unpacking, allowing the resultant to stand in a room or water or allowing the resultant to stand in a room and then in water. In the present invention, if the vacuum-packed frozen sushi product is heated by means of a microwave oven to a temperature of 50° C. or higher, preferably 60° C. or higher in the rice section as described above, the resultant is allowed to stand in a room or water or allowed to stand in a room and then in water to thereby enable the thawing to be effected in a relatively short time. In the present invention, since the vacuum-packed frozen sushi product is heated by a microwave oven to a relatively high temperature as described above, an inner surface of an upper portion of the packing bag and the sushi material or materials or the inner surface of the upper portion of the packing bag and the rice section which have been in contact with each other during the frozen period after the vacuuming become out of contact from each other, and water vapor permeates the resulting interspaces to heat the rice section or the sushi material or materials of the sushi product.

In the present invention, the sushi product may be placed and thawed in a microwave oven with the sushi material or materials covered with the shaped rice section. In this case, most of microwaves with which the sushi product is irradiated are absorbed in the rice section covering the sushi material or materials, and on the other hand, the sushi material or materials covered with the rice section are shielded from the microwaves by the rice section and thereby heated to only a small extent. The sushi material or materials are heated with the microwaves only in the exposed portions thereof. In a case where a boxed sushi product or a rod-shaped sushi product is thawed by means of a microwave oven, a temperature distribution in the sushi product heated by the microwave oven is not uniform. In the shaped rice section of the sushi product, its exposed surfaces irradiated with microwaves have high temperatures, and portions located nearer to corners have higher temperatures because of concentration of microwave energy. According to the temperature distribution measured by the present inventors, it has been found that exposed longitudinal ends of the shaped rice section and the sushi material or materials of the sushi product have markedly higher temperatures as compared with those of surfaces of center portions of the shaped rice section and the sushi material or materials, and an interior portion of the sushi product, for example, a portion which is located at the center in the longitudinal direction and at which the sushi material or materials and the shaped rice section are in contact with each other has a considerably lower temperature as compared with those of the surfaces of the center portions of the shaped rice section and the sushi material or materials. In the case of a rod-shaped sushi product or a boxed sushi product, the rod-shaped sushi product or the boxed sushi heated by means of a microwave oven is cut into easy-to-eat sized pieces and then served. In this connection, it has been found that the shaped rice section which has just been thawed has high temperatures, and in the shaped rice section having a temperature of, for example, 40° C. or higher, adhesion between rice grains thereof is strong, and this results in difficulty in cuffing pieces therefrom, and thus the sushi product is likely to undergo deformation (during cutting) and lose its original shape. To cope therewith, in the present invention, It was found that when the temperatures of the shaped rice section are allowed to lower to 15° C. to 30° C., preferably 15° C. to 25° C., the adhesion between the rice grains of the shaped rice section is thereby moderated to enable pieces to be cut from the sushi product with ease.

In the present invention, after the heating of the sushi product by microwave-heating, to make use of residual heat in the rice and heat of the water vapor for heating the sushi material or materials which remain cool, the resultant is allowed to stand in a room of water or allowed to stand in a room and then in water without unpacking to steam the heated sushi product with the water vapor generated in the packing bag, whereby temperatures of the sushi material or materials are raised and, in parallel therewith, temperatures of the shaped rice section is lowered. In the present invention, in the packing bag, a space is formed around the shaped rice section to permit water vapor generated in the thawing to freely flow therethrough, whereby steaming is efficiently effected. By virtue of this, in a relatively short period of time, the temperatures in the entire shaped rice section can roughly be approximated to render the thawed packed frozen sushi product easy-to-cut. When the packed frozen sushi product is thawed by means of a microwave oven, the packed frozen sushi product may be heated, with the packing bag left hermetically sealed, by the microwave oven for a relatively long period of time, for example, 2.5 minutes or longer, preferably 3.5 to 4.5 minutes to bring temperatures of the end surfaces of the shaped rice section to 50° C. or higher, for example, not lower than 60° C. or not lower than 70° C. at a time immediately after the thawing, and allowed to stand for a predetermined period of time to steam and heat thereby the thawed packed sushi product, whereby unevenness in temperature distribution is diminished to render the sushi product easy-to-cut for serving cut pieces. Further, the time for thawing may be reduced by cooling the sushi product after the thawing by means of a microwave oven with water to effect steaming while cooling portions which have been heated to relatively high temperatures.

In the present invention, the sushi product contained in the box is placed in the packing bag together with the box. When the packing bag in which the sushi product is contained together with the box is vacuumed to a reduced pressure of 600 mmHg or lower, preferably 400 mmHg or lower, more preferably 350 mmHg or lower, the packing bag collapses under atmospheric pressure, and the inner surface of the packing bag is brought in tight contact with the sushi material and the shaped rice section to enable the sushi product to be held fixedly in the box. In this manner, the packing bag is vacuumed, and the inner surface of an upper portion of the bag is thereby brought in tight contact with the sushi material or materials and the shaped rice section under atmospheric pressure, and the sushi material or materials and the shaped rice section are frozen in such a tightly held condition. Accordingly, the sushi material or materials undergo no dislocation during the thawing. Further, in the present invention, the space is formed around the sushi product. In the vacuuming process, however, air around the sushi product is removed, and heat transfer in the cooling is thereby promoted.

In the present invention, the box containing the sushi product may be prepared by topping a shaped rice section with a sushi material or materials in a sushi mold (kata) to make a sushi product, and placing the thus prepared sushi product in a box with the sushi material or materials up, or by topping a shaped rice section placed in a box with a sushi material or materials to make a sushi product in the box. In the present invention, however, the sushi product may be placed with the sushi material or materials down in the box. In the present invention, the box which contains the sushi product is placed in the flexible plastic packing bag, and the packing bag is vacuumed and hermetically sealed to bring the inner surface of the flexible plastic packing bag in tight contact with the sushi material or materials, whereby the sushi product is fixedly held in the box, and the vacuum-packed sushi product is brought in contact with a refrigerant cooled to a freezing temperature to freeze the contents of the packing bag of the vacuum-packed sushi product together inclusive of the sushi product. Accordingly, the procedure to prepare the frozen packed sushi product may be performed almost mechanically and thus easily automatized to enable hygienic mass production. Accordingly, frozen packed sushi products of high quality can regularly be produced. Further, in the present invention, the sushi product is placed in the box, and the box containing the sushi product is placed in the packing bag with no covering thereon, and consequently, the narrow interspaces are formed between the box and the sushi product and between the box and the packing bag to permit water vapor emanating mainly from the shaped rice section in the microwave-heating by means of a microwave oven to flow through the thus formed interspaces, whereby heat is applied to the sushi material or materials still frozen to effect thawing and heating.

The packed frozen sushi product of the present invention comprises a vacuumed and hermetically sealed flexible microwave-safe plastic packing bag, an open-topped plastic box placed in the packing bag, and a sushi product placed in the box. In the packing bag, a space is formed between the sushi product and the packing bag, and an inner surface of the packing bag is in contact with an upper surface of the sushi product, and the packing bag, the box and the sushi product are frozen together in a unified form. Accordingly, when the packed frozen sushi product is thawed using a microwave oven without unpacking, the inside of the packing bag is thereby filled with water vapor generated in the thawing. Subsequent to the thawing, steaming is effected by means of the water vapor generated in the thawing to successively heat the sushi product, thereby enabling the entire sushi product to have roughly approximated temperatures in a relatively short time.

Further, in the present invention, only by vacuuming the packing bag, the sushi product can be frozen with the packing bag in contact with the upper surface of the sushi material or materials or the shaped rice section. Accordingly, the sushi product contained in the plastic box can be fixedly held in the box. As described above, in the present invention, the sushi product is frozen with the vacuumed packing bag in contact therewith. Accordingly, after placement of the sushi product in the plastic box, no substantial dislocations of the sushi product and the sushi material or materials are caused. By virtue of this, operating efficiency is improved, and increased product yield is realized. Moreover, in the present invention, the sushi product is placed in the plastic box, and the box containing the sushi product is placed in the plastic backing bag, and the resultant is frozen in a unified form. Accordingly, the space is formed around the sushi product. In particular, the interspaces are formed between the sushi product and the box and between the box and the packing bag. By the flow of water vapor generated in the thawing through the space, it is facilitated to render the temperature of the sushi product after the steaming roughly uniform.

In the present invention, the sushi product is placed in the plastic box so as to stabilize the position thereof. In a case of a sushi product comprising a shaped rice section topped with a sushi material or materials, the sushi product may be placed in the plastic box with its sushi material or materials up or with its sushi material or materials down. When the sushi product is placed in the plastic box with its sushi material or materials down, in thawing by means of a microwave oven, its shaped rice section located on the sushi material or materials is irradiated with most of microwaves to enable temperatures of the sushi material or materials to be kept lower than those of the shaped rice section. In a case of a rolled sushi product, the sushi product may be placed in the box irrespective of placing position of its sushi material or materials. In this case, if exposed ends of the sushi material or materials are covered with rice of 5 mm or more, preferably 10 mm or more in thickness, temperatures of the sushi material or materials can be kept lower than those of the shaped rice section.

As described above, the plastic box containing the sushi product is placed in the flexible packing bag made of a plastic film to isolate from the surrounding environment. The packing bag which contains the box containing the sushi product is vacuumed and has its mouth hermetically closed. The plastic packing bag having its mouth hermetically closed as a whole is cooled and frozen in a unified form, for example, by soaking it in a refrigerant such as a brine. In this manner, the packed frozen sushi product can be prepared relatively simply. Further, the packed frozen sushi product may be prepared relatively simply by placing a frozen sushi product which has been preliminarily frozen in a plastic box, placing the box containing the frozen sushi product in a flexible plastic packing bag, vacuuming the packing bag, and hermetically closing a mouth of the vacuumed packing bag.

EXAMPLES

Embodiments of the present invention will be described hereinbelow with reference to the accompanying drawings. It should be noted, however, that the present invention is by no means restricted by the following description or Examples.

Figure 2:
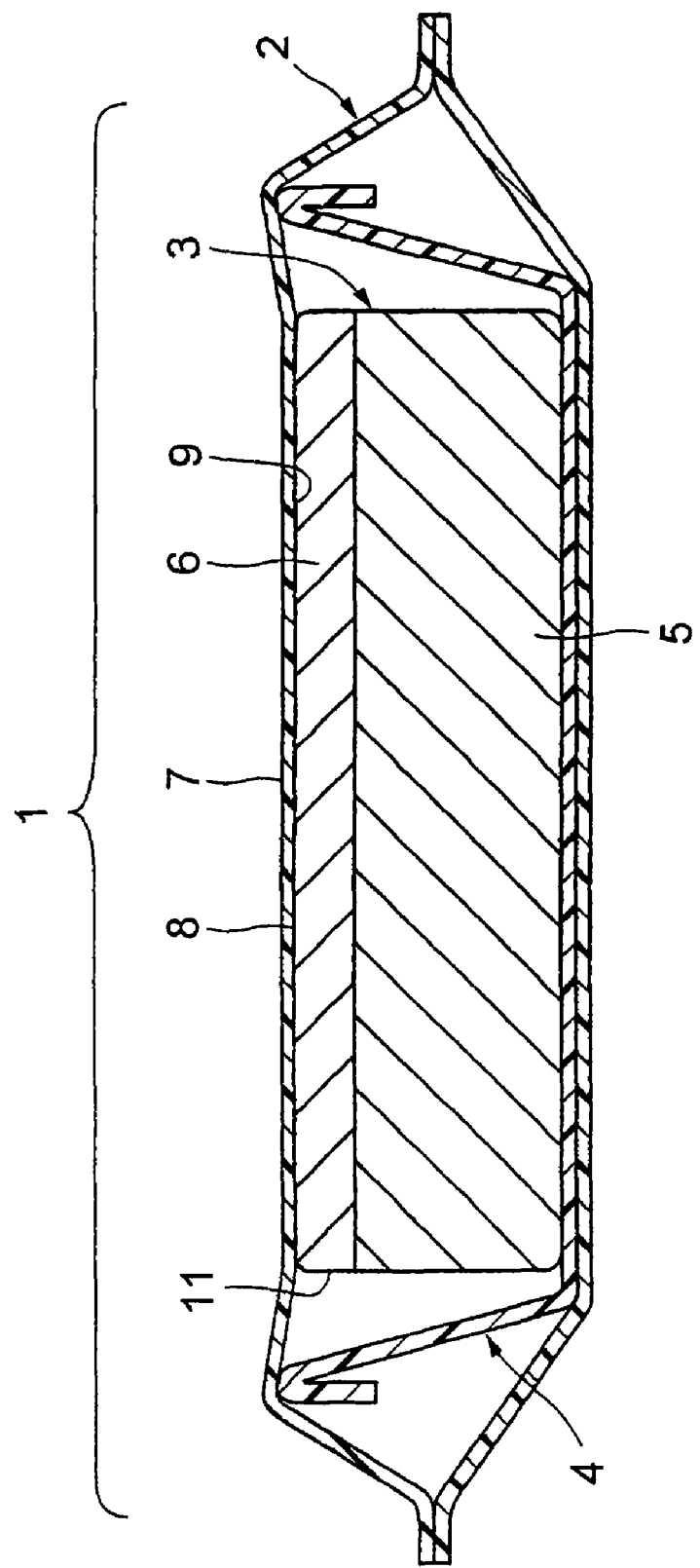
FIG. 2 is a schematic sectional front view schematically illustrating the Embodiment shown in FIG. 1.
Figure 3:
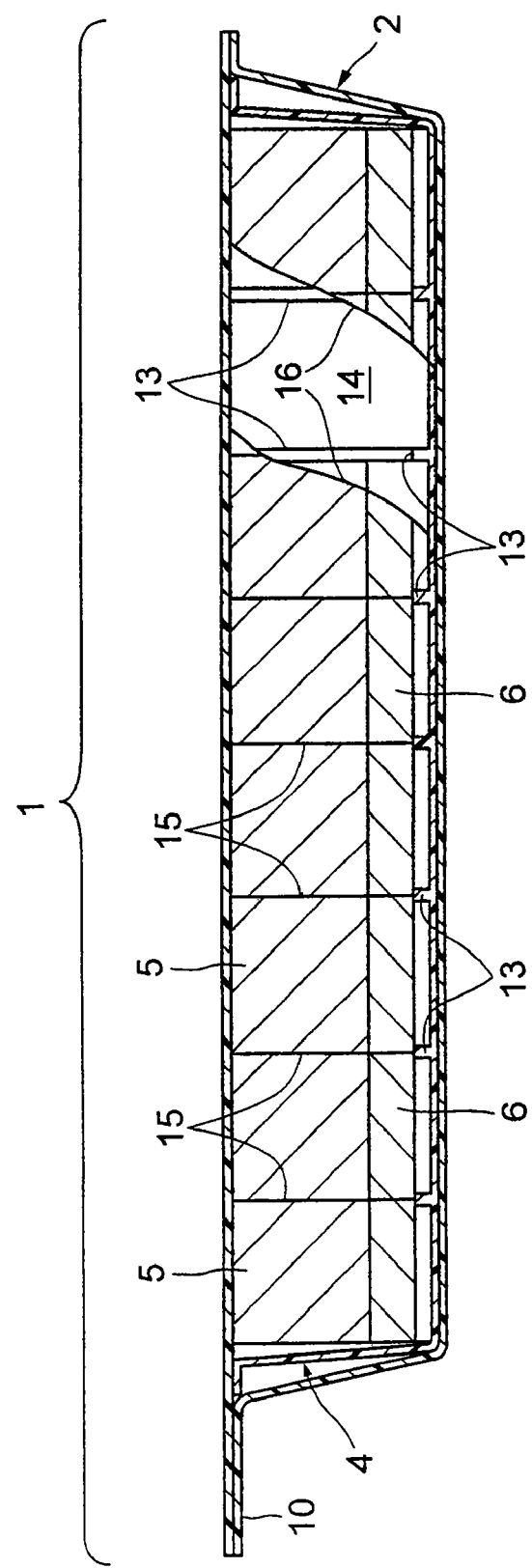
FIG. 3 is a schematic sectional side view schematically illustrating another Embodiment of the present invention.
Figure 4:
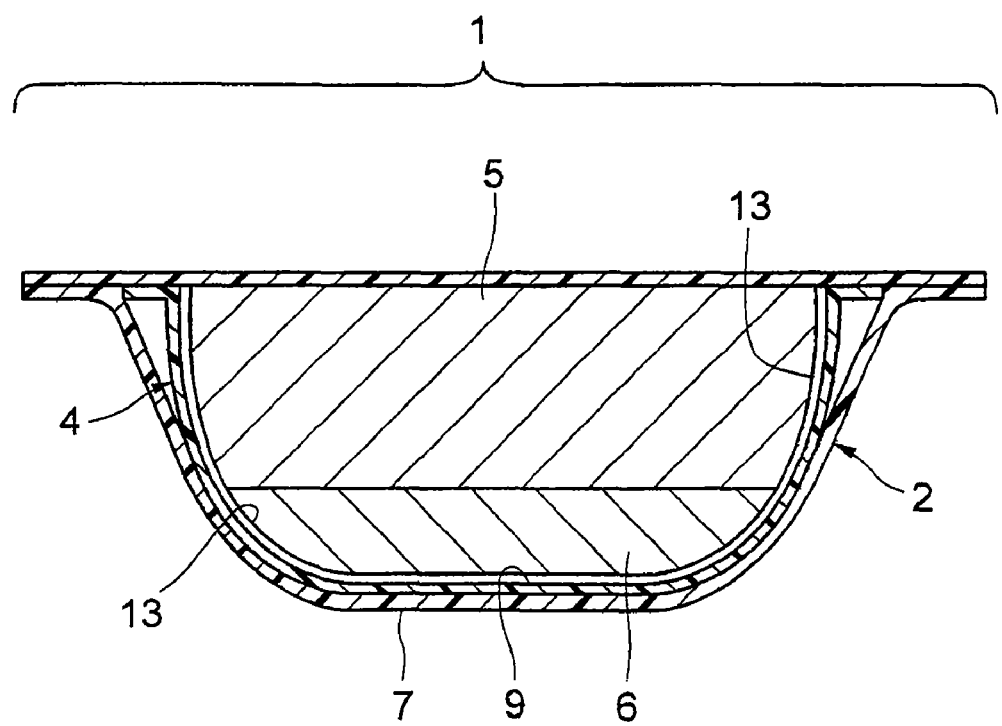
FIG. 4 is a schematic sectional front view schematically illustrating the Embodiment shown in FIG. 3.

FIG. 1 is a schematic sectional side view schematically illustrating one Embodiment of the present invention. FIG. 2 is a schematic sectional front view schematically illustrating Embodiment shown in FIG. 1. FIG. 3 is a schematic sectional side view schematically illustrating another Embodiment of the present invention. FIG. 4 is a schematic sectional front view schematically illustrating Embodiment shown in FIG. 3. In FIGS. 1 to 4, the same reference numbers are used to designate corresponding elements.

Embodiment 1

In Embodiment shown in FIGS. 1 and 2, a packed frozen sushi product 1 has a microwave-transparent plastic packing bag 2 as an outer covering, and a microwave-transparent plastic box 4 containing a sushi product 3 is contained in the plastic packing bag 2, the interior of the packed frozen sushi product 1 is in whole vacuumed and, in the pressure-reduced state, frozen together with the sushi product 3 having a shaped rice section 5 and a sushi material or materials 6 in a unified form. In the packed frozen sushi product 1, the plastic packing bag 2 has its inside vacuumed and frozen in such a pressure-reduced state that a center portion 7 of its top is depressed under atmospheric pressure, and an inner surface 9 of the center portion 7 is thereby in tight contact with an upper surface 8 of the sushi material or materials 6 of the sushi product 3. Accordingly, also in thawing, the packed frozen sushi product is thawed with the upper surface 8 of the sushi material or materials 6 of the sushi product 3 in contact with the inner surface 9 of the center portion 7 of top of the plastic packing bag, and thus the shaped rice section 5 and the sushi material or materials 6 in the box 4 undergo no substantial dislocations relative to pre-vacuuming positions thereof. In addition, since the interior of the packing bag is in the pressure-reduced state, if water vapor is generated by microwave-heating for about 2.5 to 6 minutes, the packing bag 2 is not broken.

This Embodiment is constructed as described above, and thus the packed frozen sushi product 1 may be prepared, for example, in the following manner. A shaped rice section 5 is topped with a sushi material or materials 6 to prepare a sushi product 3, and the prepared sushi product 3 is placed in a plastic box 4. The box 4 containing the sushi product 3 is placed in a packing bag 2, and a mouth 10 of the packing bag 2 is connected to a suction port of a vacuum pump (neither of them is shown), and the inside of the packing bag 2 is vacuumed under a pressure of, for example, 400 mmHg. In the vacuuming step, a top portion 7 of the packing bag 2 is deflated inward under atmospheric pressure to press an upper surface 8 of the sushi material or materials 6, thereby stabilizing positions of the sushi product 3 and the sushi material or materials in the box 4. After completion of the vacuuming, the mouth 10 of the packing bag 2 is closed by heat-sealing, and the thus hermetically sealed plastic packing bag 2 is soaked in an ethanol brine refrigerant to freeze the plastic packing bag in whole in a unified form, whereby the packed frozen sushi product 1 is prepared. The packed frozen sushi products 1 thus prepared are cold-stored in an insulated storage at a low temperature of, for example, −25° C. or lower, and appropriately, they are taken out and thawed and served as sushi.

In this Embodiment, the packed frozen sushi product 1 may be thawed in a microwave oven with its sushi material or materials 6 up. Alternatively, the packed frozen sushi product may be thawed with the shaped rice section 5 up and the sushi material or materials 6 down, i.e., with the plastic box 4 turned upside down. In a case where thawing is performed in a microwave oven with the sushi material or materials 8 up, the sushi product is one whose sushi material or materials 6 may be heated. Microwaves are emitted toward the sushi product 3 in the vertical direction and sidewise directions to heat the upper surface 8, the front and rear end surfaces 11 and the side surfaces 12 which are exposed surfaces of the sushi material or materials 6. In exposed portions, the shaped rice section 5 and the sushi material or materials 6 are heated to substantially the same degree immediately after thawing of the sushi product 3. The microwaves emitted toward the sushi product 3 are absorbed solely through the exposed portions of the shaped rice section 5 and the sushi material or materials 6 to heat the shaped rice section 5 and the sushi material or materials 6. From the shaped rice section 5 heated in this manner, water vapor is generated as the temperature of the shaped rice section increases. The flexible plastic packing bag 2 is filled with the generated water vapor to heat the shaped rice section 5 and the sushi material or materials 6. Consequently, the sushi product 3 is so thawed as to have substantially uniform temperature throughout the sushi product. In the following, specific Examples of this Embodiment will be given.

Example 1

1400 ml of seasoned vinegar was added in 13 kg of cooked rice, followed by mixing to uniformly vinegar the rice. Then, the rice thus seasoned with vinegar was cooled to 50° C. to prepare vinegar-seasoned rice, i.e., vinegared rice. To the prepared vinegared rice, minced shiitake mushrooms which had been reconstituted with water and then cooked in a broth seasoned with sugar, soy sauce and sweet cooking sake' (mirin) and minced gourd shavings (kampyo) which had been reconstituted with water and then cooked in a broth seasoned with sugar, soy sauce and sweet cooking sake' (mirin) were added, followed by mixing to prepare sushi rice. On the other hand, belly-slit conger eels (anago) were cooked in a broth seasoned with sugar, soy sauce and sweet cooking sake' and cut into strips of 5.5 cm in width and 18 cm in length to make conger eel fillet preparations as a sushi material for conger eel sushi.

Using 220 g of the sushi rice and 40 g of a conger eel fillet preparation as a sushi material, each of conger eel-topped boxed sushi products of 5.5 cm in width, 18 cm in length and 2.7 cm in thickness (L size) and 260 g in weight was prepared using a box-shaped sushi mold (hako-gata). The conger eel-topped boxed sushi product (L size) was removed from the sushi mold and placed in a plastic box with its conger eel fillet preparation as a sushi material down. The box used in this Example had a reversed truncated rectangular pyramidal shape, i.e., reversed kamaboko-like shape and had inner dimensions of 6.2 cm in width and 18.2 cm in length at its bottom, and 6.2 cm in width and 19.2 cm in length at its top opening, and a depth of 3.0 cm, and a volume of 339.7 cm$^3$. A volume of a space in a packing bag was 45 cm$^3$ and the volume ratio of the space to the sushi product was 0.11. The box which contained the sushi product was placed in a flexible packing bag made of a laminated film composed of a polyethylene film as an inner layer and a nylon film as an outer layer, and the packing bag was vacuumed by a vacuum pump to a pressure of 16 cmHg, i.e., 160 mmHg and had its mouth hermetically closed by heat-sealing. In the vacuumed and hermetically sealed packing bag, its top portion was depressed and in tight contact with the shaped rice section. The packing bag, in which the conger eel-topped boxed sushi product placed in the plastic box had been placed together with the plastic box and which had been vacuumed and hermetically sealed by heat-sealing, was kept in ethyl alcohol having a temperature of −35° C. as a brine for 45 minutes and thereby brine-frozen to obtain a packed frozen conger eel-topped sushi product (L size). In the packed frozen conger eel-topped sushi product (L size), the plastic packing bag as an outer covering, the plastic box and the conger eel-topped sushi product as contents of the plastic box were frozen together in a unified form. The packed frozen conger eel-topped sushi products (L size) were stored at −27.7° C. on average.

In cooking the packed frozen conger eel-topped sushi product (L size), a 500 W microwave oven was used.

The packed frozen conger eel-topped sushi product (L size) in this Example was placed in the 500 W microwave oven and thawed by heating for 4 minutes and 30 seconds. 4 minutes and 30 seconds, which was the same as the time of thawing by the microwave oven, after completion of the thawing, the resulting packed frozen sushi product was removed from the microwave oven and allowed to stand in a room having a room temperature of 20.2° C. for 30 minutes to effect steaming. In this Example, with respect to the exposed rice section of the sushi product heated by the microwave oven, temperatures of "a portion of the under surface of the rice section which was located at the center in the width direction and 1 cm inner from a longitudinal end" (in Table 1, referred to as "end portion of the under surface of the rice section"), and temperatures of "a portion of the under surface of the rice section which was located at the center in the width direction and at the center in the longitudinal direction" (in Table 1, referred to as "center portion of the under surface of the rice section") were measured immediately after the thawing, after a lapse of 15 minutes in the steaming, and after a lapse of 30 minutes for the steaming. Also, with respect to the sushi material of the thawed sushi product, temperatures of "a portion of the bag-side surface of the sushi material which was located at the center in the width direction and 1 cm inner from a longitudinal end" (in Table 1, referred to as "end portion of the bag-side surface of the sushi material"), temperatures of "a portion of the bag-side surface of the sushi material which was located at the center in the width direction and at the center in the longitudinal direction" (in Table 1, referred to as "center portion of the bag-side surface of the sushi material"), temperatures of "a portion of the rice-side surface of the sushi material which was located at the center in the width direction and 1 cm inner from a longitudinal end" (in Table 1, referred to as "end portion of the rice-side surface of the sushi material") and temperatures of "a portion of the rice-side surface of the sushi material which was located at the center in the width direction and at the center in the longitudinal direction" (in Table 1, referred to as "center portion of the rice-side surface of the sushi material") were measured immediately after the thawing, after a lapse of 15 minutes in the steaming, and after a lapse of 30 minutes for the steaming. The results are shown in Table 1.

TABLE 1

|  | Immediately after thawing ° C. | Post-15 minutes-steaming ° C. | Post-30 minutes-steaming ° C. |
| --- | --- | --- | --- |
| End portion in the under surface of the rice section | 82.0 | 51.0 | 36.0 |
| Center portion in the under surface of the rice section | 78.2 | 35.3 | 27.6 |
| End portion in the bag-side surface of the sushi material | 71.9 | 48.0 | 33.5 |
| Center portion in the bag-side surface of the sushi material | 33.1 | 28.5 | 27.7 |
| End portion in the rice-side surface of the sushi material | 57.4 | 50.8 | 36.2 |
| Center portion in the rice-side surface of the sushi material | 35.3 | 29.4 | 27.8 |

In Table 1, with respect to the boxed sushi product, it is seen that immediately after the thawing, the temperature of end portion of the under surface of the rice section was about 4 degrees Centigrade different from that of the center portion the under surface of the rice section and about 59 degrees Centigrade different from that of the center portion of the bag-side surface of the sushi material. At the time when the sushi product was steamed for 15 minutes, however, the temperature of end portion of the under surface of the rice section was about 16 degrees Centigrade different from that of the center portion the under surface of the rice section and about 23 degrees Centigrade different from that of the center portion of the bag-side surface of the sushi material. Further, at the time when the sushi product was steamed for 30 minutes, the temperature of end portion of the under surface of the rice section was about 8 degrees Centigrade different from that of the center portion the under surface of the rice section and about 8 degrees Centigrade different from the center portion of the bag-side surface of the sushi material, and the temperatures of the shaped rice section and the sushi material of the sushi product were within a temperature range of about 27 to 35° C., and the boxed sushi product became easy-to-cut with a kitchen knife.

Example 2

In this Example, conger eel-topped boxed sushi products of 5.5 cm in width, 18 cm in length and 2.7 cm in thickness (L size) and 260 g in weight which had been prepared in Example 1 were used. The conger eel-topped boxed sushi product (L size) was placed in a plastic box with its conger eel fillet preparation as a sushi material down. Also in this Example, the box used had a reversed truncated rectangular pyramidal shape, i.e., reversed kamaboko-like shape and had inner dimensions of 6.2 cm in width and 18.2 cm in length at its bottom, and 6.2 cm in width and 19.2 cm in length at its top opening, and a depth of 3.0 cm, and a volume of 339.7 cm$^3$, as in Example 1. A volume of a space in a packing bag was 45 cm$^3$ and the volume ratio of the space to the sushi product was 0.11. The box which contained the sushi product was placed in a flexible packing bag made of a laminated film composed of a polyethylene film as an inner layer and a nylon film as an outer layer, and the packing bag was vacuumed by a vacuum pump to a pressure of 16 cmHg, i.e., 160 mmHg and had its mouth hermetically closed by heat-sealing. In the vacuumed and hermetically sealed packing bag, its top portion was depressed and in tight contact with the shaped rice section.

In this Example, the box which contained the sushi product was placed in a flexible packing bag made of a laminated film composed of a polyethylene film as an inner layer and a nylon film as an outer layer, and the packing bag was vacuumed by a vacuum pump to a pressure of 16 cmHg, i.e., 160 mmHg and had its mouth hermetically closed by heat-sealing.

The packing bag, in which the conger eel-topped boxed sushi product placed in the plastic box had been placed together with the plastic box and which had been vacuumed and hermetically sealed by heat-sealing, was kept in ethyl alcohol having a temperature of −35° C. as a brine for 45 minutes and thereby brine-frozen to obtain a packed frozen conger eel-topped sushi product (L size). In the packed frozen conger eel-topped sushi product (L size), the plastic packing bag as an outer covering, the plastic box and the conger eel-topped sushi product as contents of the plastic box were frozen together in a unified form. The packed frozen conger eel-topped sushi products (L size) were stored at −27.7° C. on average.

In cooking the packed frozen conger eel-topped sushi product (L size), a 500 W microwave oven was used.

The packed frozen conger eel-topped sushi product (L size) in this Example was placed in the 500 W microwave oven and thawed by heating for 4 minutes and 30 seconds. 4 minutes and 30 seconds, which was the same as the time of thawing by the microwave oven, after completion of the thawing, the resulting packed frozen sushi product was removed from the microwave oven and allowed to stand in a room having a room temperature of 20.2° C. for 10 minutes and then allowed to stand in water having a temperature of 14.7° C. for 3 minutes and 5 minutes to effect steaming. In this Example, in the course of the steaming step, temperatures of "a portion of the under surface of the rice section which was located at the center in the width direction and 1 cm inner from a longitudinal end" (in Table 2, referred to as "end portion of the under surface of the rice section"), and temperatures of "a portion of the under surface of the rice section which was located at the center in the width direction and at the center in the longitudinal direction" (in Table 2, referred to as "center portion of the under surface of the rice section") were measured immediately after the thawing, after a lapse of 15 minutes in the steaming, and after a lapse of 30 minutes for the steaming. Also, with respect to the sushi material of the thawed sushi product, temperatures of "a portion of the bag-side surface of the sushi material which was located at the center in the width direction and 1 cm inner from a longitudinal end" (in Table 2, referred to as "end portion of the bag-side surface of the sushi material"), temperatures of "a portion of the bag-side surface of the sushi material which was located at the center in the width direction and at the center in the longitudinal direction" (in Table 2, referred to as "center portion of the bag-side surface of the sushi material"), temperatures of "a portion of the rice-side surface of the sushi material which was located at the center in the width direction and 1 cm inner from a longitudinal end" (in Table 2, referred to as "end portion of the rice-side surface of the sushi material") and temperatures of "a portion of the rice-side of the sushi material which was located at the center in the width direction and at the center in the longitudinal direction" (in Table 2, referred to as "center portion of the rice-side surface of the sushi material") were measured immediately after the thawing, after a lapse of 15 minutes in the steaming, and after a lapse of 30 minutes for the steaming. The results are shown in Table 2.

TABLE 2

|  | Immediately after thawing ° C. | Post 10 minutes-steaming in a room ° C. | Post 3 minutes-steaming in water ° C. | Post 5 minutes-steaming in water ° C. |
| --- | --- | --- | --- | --- |
| End portion in the under side surface of the rice section | 82.0 | 60.4 | 31.1 | 27.1 |
| Center portion in the under surface of the rice section | 78.2 | 43.1 | 25.3 | 23.0 |
| End portion in the bag-side surface of the sushi material | 71.9 | 56.5 | 33.8 | 30.3 |
| Center portion in the bag-side surface of the sushi material | 33.1 | 26.5 | 21.4 | 19.1 |

TABLE 2-continued

| | Immediately after thawing ° C. | Post 10 minutes-steaming in a room ° C. | Post 3 minutes-steaming in water ° C. | Post 5 minutes-steaming in water ° C. |
|---|---|---|---|---|
| End portion in the rice-side surface of the sushi Material | 57.4 | 52.5 | 35.9 | 25.6 |
| Center portion in the rice-side surface of the sushi material | 35.3 | 29.9 | 22.8 | 22.3 |

In Table 2, with respect to the boxed sushi product, it is seen that immediately after the thawing, the temperature of end portion of the under surface of the rice section was about 4 degrees Centigrade different from that of the center portion the under surface of the rice section and about 49 degrees Centigrade different from that of the center portion of the bag-side surface of the sushi material. At the time when the sushi product was steamed for 10 minutes in a room, however, the temperature of end portion of the under surface of the rice section was about 17 degrees Centigrade different from that of the center portion the under surface of the rice section and about 34 degrees Centigrade different from that of the center portion of the bag-side surface of the sushi material. Further, at the time when the sushi product was steamed for 3 minutes in water, the temperature of end portion of the under surface of the rice section was about 6 degrees Centigrade different from that of the center portion the under surface of the rice section and about 10 degrees Centigrade different from the center portion of the bag-side surface of the sushi material. Moreover, at the time when the sushi product was steamed for 5 minutes in water, the temperature of end portion of the under surface of the rice section was about 7 degrees Centigrade different from that of the center portion the under surface of the rice section and about 8 degrees Centigrade different from the center portion of the bag-side surface of the sushi material, and the temperatures of the shaped rice section and the sushi material of the sushi product were within a temperature range of about 19 to 30° C., and the boxed sushi product became easy-to-cut with a kitchen knife.

INDUSTRIAL APPLICABILITY

In the present invention, since the packed frozen sushi product is prepared by placing a sushi product in a plastic box, and vacuum-packing and freezing the resultant to thereby form a space around the sushi product which space has a pressure of 50 to 600 mmHg and a volume 0.1 to 0.7 times that of the sushi product, the packed frozen sushi product can be thawed in a relatively short period of time. Further, in the present invention, the vacuum-packed frozen sushi product which is hygienically excellent can simply be prepared, and the procedure can be performed relatively simply and easily. Accordingly, the vacuum-packed frozen sushi product can be prepared mechanically and thus efficiently on a large scale. In addition, the procedure to prepare the frozen packed sushi product which has heretofore been considered to be difficult can be performed almost mechanically with no substantial manual intervention and thus easily automatized to enable vacuum-packed frozen sushi products of high quality to regularly be produced. Therefore, the present invention has a great industrial applicability.

The invention claimed is:

1. A microwavable vacuum-packed frozen sushi product, configured for controlled thawing of a frozen sushi food material or frozen sushi food materials contained therein, the frozen sushi product containing a rice section, the frozen sushi product being configured to be thawed by means of a microwave oven which elevates a temperature of an end portion on a surface of the rice section to 50° C. and higher, the frozen sushi product comprising:
  a microwavable flexible plastic packing bag which is vacuumed to a pressure of 140 to 350 mmHg and, in the pressure-reduced state, hermetically sealed;
  an open-topped plastic box, the top opening of which is formed so as to be broader than a bottom of the plastic box, placed in said plastic packing bag; and
  a frozen sushi food product which is formed by at least one shaped form of frozen boiled rice and the frozen sushi material or sushi food materials on a surface of each form of at least one shaped form of the frozen boiled rice, placed on the bottom of the box;
  the microwavable vacuum-packed frozen sushi product being configured such that microwave heating of the frozen sushi food product heats an end portion on a surface of the rice section to a temperature of at least 50° C., at which time the frozen sushi food product is removed from the microwave heating and wherein the heated rice provides heated water vapor which substantially evenly heats and thaws the sushi food material or sushi food materials to a temperature between 15° and 30° C., the microwavable vacuum-packed frozen sushi product being configured to provide the thawing of the sushi food material or sushi food materials with an inner surface of the plastic packing bag, the plastic box, and the sushi food product being frozen together in a unified form; and
  an empty space being allowed to remain in said hermetically sealed packing bag in the pressure-reduced state around said sushi food product with the empty space having a volume 0.2 to 0.5 times that of a volume of said sushi food product at the time of thawing, and the empty space in the hermetically sealed packing bag being configured to allow heating of the sushi product by steam emanating at least from the shaped rice section and flowing into the empty space between the sushi product and the box, after the elevation of the temperature of the rice section by means of the microwave oven and termination of the microwave heating thereby steaming the shaped rice section and the sushi food material or sushi food materials to a temperature between 15° and 30° C.

2. The microwavable vacuum-packed frozen sushi product according to claim 1, wherein the box is a box-, cylinder-like, tray- or dish-like container having a square shape, a round shape or an ellipse shape when viewed in a plan.

3. The microwavable vacuum-packed frozen sushi product according to claim 1, wherein a number of the sushi food product or sushi food products which are placed in said box is one or more.

4. The microwavable vacuum-packed frozen sushi product according to claim 1, wherein the microwave-safe plastic packing bag is made of a laminated film composed of a nylon film and a polypropylene film having a thickness larger than that of the nylon film.

5. The microwavable vacuum-packed frozen sushi product according to claim 4, wherein the box is a box-, cylinder-like, tray- or dish-like container having a square shape, a round shape or an ellipse shape when viewed in a plan.

6. A method for cooking and thawing separate parts of the microwavable vacuum-packed frozen sushi product of claim 1 by means of a microwave oven, said method comprising:
applying heat to the vacuum-packed frozen sushi product by microwave heating of the hermetically sealed packing bag to thereby cook and bring a temperature of at least a part of exposed longitudinal ends of the shaped rice section to 50° C. or higher, followed by termination of the microwave heating; and
allowing the resulting vacuum-packed sushi product to stand in a room or water or to stand in a room and then in water within a period of 30 minutes or shorter without unpacking, thereby steaming the shaped rice section and the sushi food material or sushi food materials by water vapor emanating in the hermetically sealed packing bag to thaw and bring temperatures of the sushi food material or sushi food materials and the rice section to 10° C. or higher up to room temperature.

7. A method for cooking and thawing separate parts of the microwavable vacuum-packed frozen sushi product of claim 2 by means of a microwave oven, said method comprising:
applying heat to the vacuum-packed frozen sushi product by microwave heating of the hermetically sealed packing bag to thereby cook and bring a temperature of at least a part of exposed longitudinal ends of the shaped rice section to 50° C. or higher, followed by termination of the microwave heating; and
allowing the resulting vacuum-packed sushi product to stand in a room or water or to stand in a room and then in water within a period of 30 minutes or shorter without unpacking, thereby steaming the shaped rice section and the sushi food material or sushi food materials by water vapor emanating in the hermetically sealed packing bag to thaw and bring temperatures of the sushi material or sushi materials and the rice section to 10° C. or higher up to room temperature.

8. A method for cooking and thawing separate parts of the microwavable vacuum-packed frozen sushi product of claim 3 by means of a microwave oven, said method comprising:
applying heat to the vacuum-packed frozen sushi product by microwave heating of the hermetically sealed packing bag to thereby cook and bring a temperature of at least a part of exposed longitudinal ends of the shaped rice section to 50° C. or higher, followed by termination of the microwave heating; and
allowing the resulting vacuum-packed sushi product to stand in a room or water or to stand in a room and then in water within a period of 30 minutes or shorter without unpacking, thereby steaming the shaped rice section and the sushi food material or sushi food materials by water vapor emanating in the hermetically sealed packing bag to thaw and bring temperatures of the sushi food material or sushi food materials and the rice section to 10° C. or higher up to room temperature.

9. A method for preparing a microwavable vacuum-packed frozen sushi product configured for controlled thawing of a frozen sushi food material or frozen sushi food materials contained therein, said method comprising:
disposing a sushi material or sushi materials on a top of a shaped frozen boiled rice section or in the shaped frozen boiled rice section to prepare a sushi food product;
placing the prepared sushi food product in a plastic box;
placing said plastic box containing the sushi food product in a flexible microwave-safe plastic packing bag;
vacuuming said packing bag to a pressure of 140 to 350 mmHg and hermetically sealing said packing bag to prepare a vacuum-packed sushi product with an empty space remaining in the vacuum-packed sushi product around the sushi food product with a volume 0.2 to 0.5 times that of the volume of the sushi food product; and
cooling said vacuum-packed sushi product with a refrigerant cooled to a freezing temperature to freeze said hermetically sealed packing bag, said box and the sushi food product of said vacuum-packed sushi product together in a unified form.

* * * * *